April 21, 1925.  1,534,458

S. MÖHL

UNDERFRAME FOR VEHICLES OF ANY KIND

Filed Aug. 14, 1923

INVENTOR:
Steffen Möhl
BY Wm Wallace White
ATT'Y.

Patented Apr. 21, 1925.

1,534,458

UNITED STATES PATENT OFFICE.

STEFFEN MÖHL, OF COPENHAGEN, DENMARK.

UNDERFRAME FOR VEHICLES OF ANY KIND.

Application filed August 14, 1923. Serial No. 657,323.

*To all whom it may concern:*

Be it known that I, STEFFEN MÖHL, a subject of the King of Denmark, residing at Classensgade 17, Copenhagen, Denmark, have invented new and useful Improvements in Underframes for Vehicles of Any Kind, of which the following is a specification.

The present invention relates to suspension systems for motor vehicles, and particularly motor vehicles of the character in which only one pair of springs is provided for two axles, the object of the invention being to provide a suspension system by means of which the axles will have a greater range of vertical movement and the suspending action of the springs will be generally improved.

In devices of this character as heretofore constructed, the springs were disposed on a shaft journaled on the frame of the vehicle in such a manner that the range of vertical movement depended entirely upon the elasticity of the springs. By means of the present improvement, however, the axles are caused to have a vertical movement which is entirely independent of the resiliency of the springs, whereby the cushioning effect of the springs is considerably improved.

One embodiment of the invention is illustrated in the accompanying drawing, in which—

Figure 1:
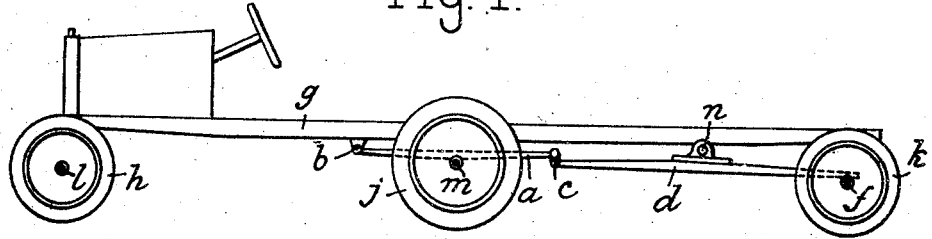
Figure 2:
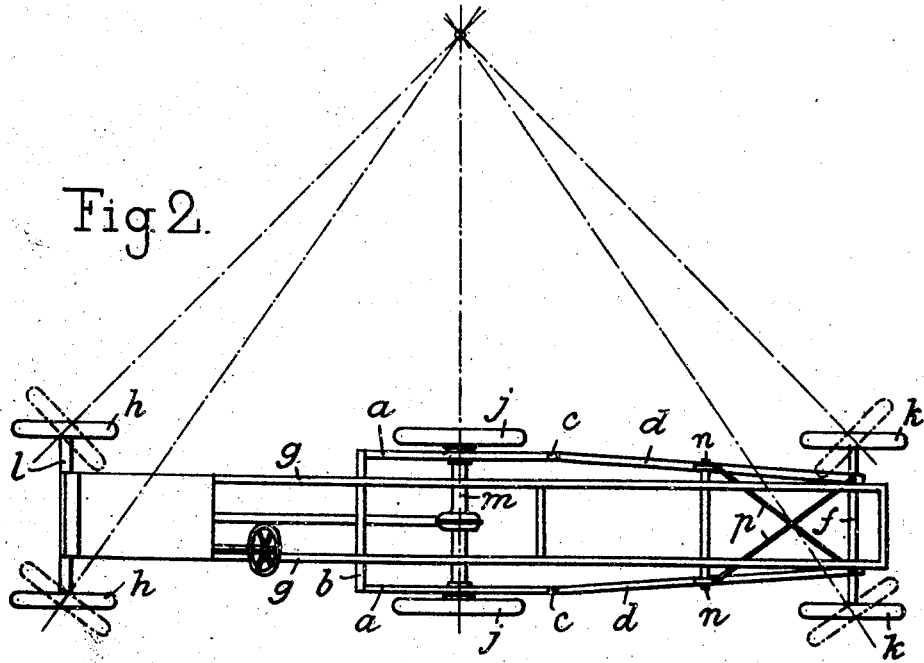

Fig. 1 shows a motor vehicle in side elevation,

Fig. 2 the same in top view.

The frame of the chassis is designated $g$ while the front wheels are marked $h$, the intermediate wheels $j$ and the rear wheels $k$. The front wheels are supported by an axle $l$ connected in known manner to the chassis frame, the steering swivels of the front wheels being hinged to the said axles. The intermediate wheels $j$ are supported by an axle $m$, which is the driving axle, so that the intermediate wheels become the driving wheels, and may be braked in ordinary manner. The axle $m$ is attached to two carriage springs $a$, the front ends of which are pivotally connected to a crossbar $b$ attached to the frame of the chassis. The rear end of each spring $a$ is hinged to the front end of a two-armed lever $d$, one such lever being provided on each side of the frame $g$, to which the levers are pivoted by means of pins $n$. The axle $f$ of the rear wheels is attached to the rear ends of the levers $d$, in such a manner that a rigid frame is formed by the two levers and the rear-wheel axle, the said frame being thus pivotally connected to the chassis frame by means of the pins $n$ and hinged to the rear ends of the springs of the intermediate wheels.

In the frame formed by the levers $d$ and the rear wheel axle $f$ there are provided two diagonally disposed stays $p$ of round iron, the front ends of which are connected to the levers $d$ at a point near the hinge pins $n$, while the rear ends are connected to the levers $d$ at the points where the latter are attached to the rear wheel axle. These crossing diagonal stays serve to take up any forces acting in the transverse direction of the frame, whereby any torsional effects on the pins $n$ will be avoided.

Having thus described my invention what I claim is:—

A suspension system for motor vehicles, comprising, in combination, a vehicle frame, a pair of laminated springs each connected at one end to said frame, a frame-shaped lever pivotally secured approximately at the center of its length to the vehicle frame and connected at one end to the free ends of said springs, a wheel axle carried by said lever at its opposite end, and a wheel axle carried by said springs approximately midway of their length.

In testimony whereof I have signed my name to this specification.

STEFFEN MÖHL.

Witnesses:
V. BELSCHNER.
K. HANSEN.